United States Patent [19]

Yeagle

[11] Patent Number: 4,762,063
[45] Date of Patent: Aug. 9, 1988

[54] BAR CODE PRINTING METHOD

[76] Inventor: Paul H. Yeagle, 214 Verdan Dr., York, Pa. 17403

[21] Appl. No.: 6,179

[22] Filed: Jan. 23, 1987

[51] Int. Cl.⁴ ............................................. B41J 1/34
[52] U.S. Cl. ................................. 101/93.01; 400/104; 101/93.29
[58] Field of Search ...................... 400/103, 104, 105; 101/93.18, 93.21, 93.28, 93.29, 93.01

[56] References Cited

U.S. PATENT DOCUMENTS

| | | | |
|---|---|---|---|
| 4,027,586 | 6/1977 | Hubbard | 101/93.01 |
| 4,320,980 | 3/1982 | Mia et al. | 400/70 |
| 4,571,100 | 2/1986 | Ueno et al. | 400/17 |
| 4,587,411 | 5/1986 | Obstfelder | 400/103 X |

Primary Examiner—Paul T. Sewell
Attorney, Agent, or Firm—Samuel M. Learned, Jr.

[57] ABSTRACT

A bar code printing method for generating extended height bar code image target patterns and human readable matter in combination therewith on bar coded items, such as labels, forms, papers and the like which enables the unmodified utilization of currently available computer driven pulsing hammer raise-engraved fixed font printers of that type wherein the long axis of the bar code font characters are disposed parallel to the lateral edge direction of pitch advance feed of the print stock material wherein the printing method is accomplished by the technique of utilizing raise-engraved bar code characters in the printing font which are of a slightly greater elevation than the pitch advance of the printing stock whereby each successive impact printed bar code character image on printing stock pitch advance vertically registers on and slightly overlaps the previously printed image thereof and thus produces a continually printed bar code image target pattern to a line length of any multiple of pitch advances desired in turn thus to produce an extended height bar code image target pattern of a sufficient size so as to enhance either the manual or mechanical presentation thereof to the optical sensing head of an electronic scanner-reader and thereby in turn enhance facilitated scanner-reader bar code image target pattern acquisition and sensing with greater accuracy.

4 Claims, 4 Drawing Sheets

Fig. 6
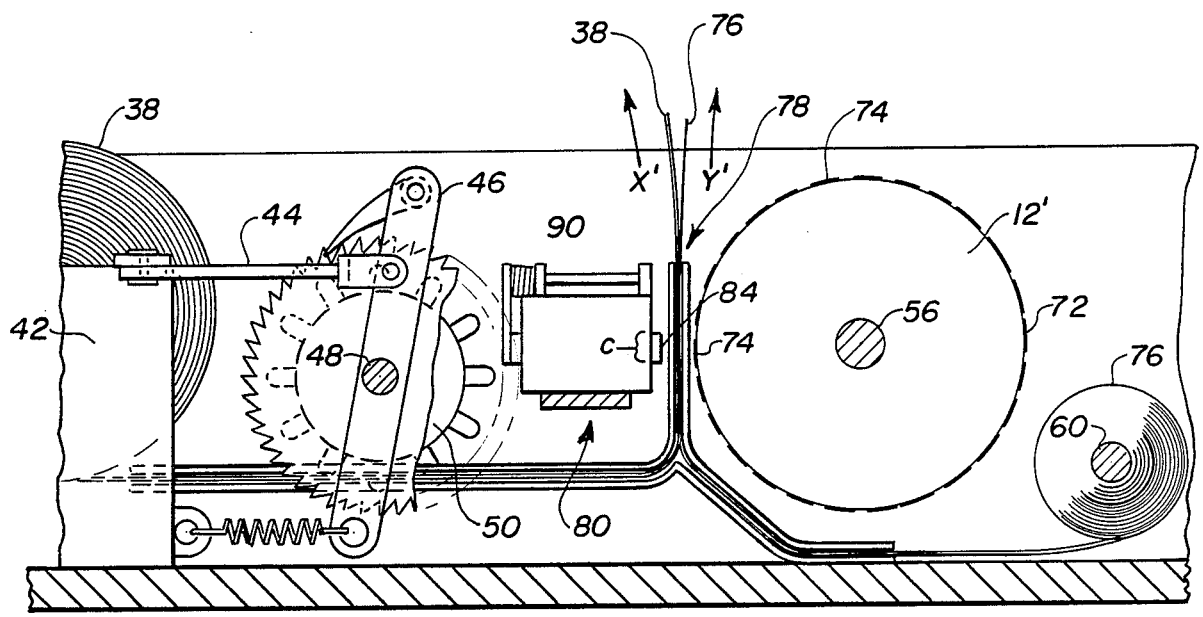
Fig. 7a
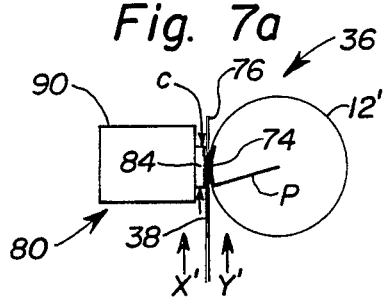
Fig. 8a
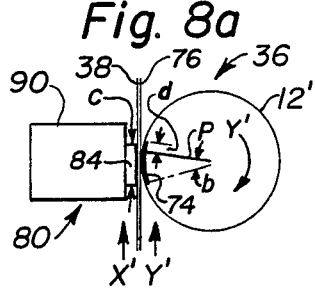
Fig. 9a
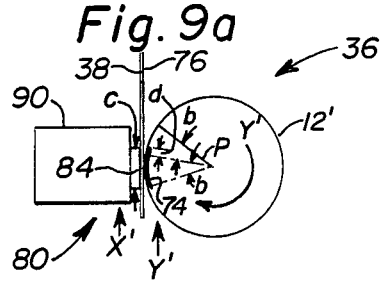
Fig. 7b
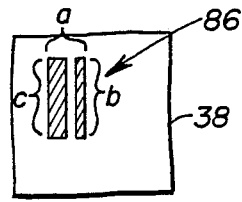
Fig. 8b
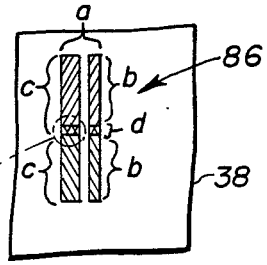
Fig. 9b
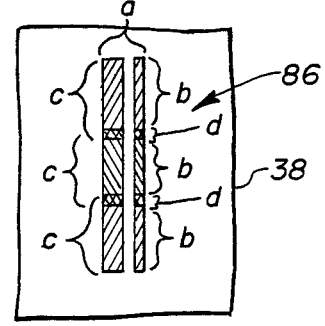
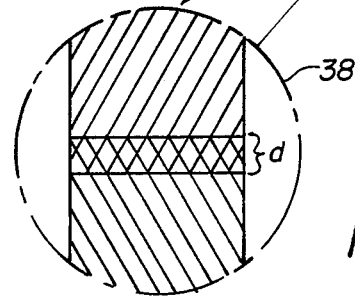
Fig. 8c

BAR CODE PRINTING METHOD

BACKGROUND OF THE INVENTION

The use of electronic scanner-reader devices equipped with optical sensing heads to pick-up and transmit from either manual or mechanical presentation of a bar coded target pattern product identification, pricing, or inventory data in facilitating automated product handling, processing, or control procedures is now well developed and established and in widespread daily use. Successful and reliable utilization of the foregoing technology, however, depends upon a number of factors, among which are first the requirements for high standards of printed bar code image quality in order to enable and enhance accurate optical sensing and consistent reading, and second in order to enhance the accuracy of bar code scanning the bar code image target pattern must be of a sufficient size to be picked up with reasonable facility in either a manual or mechanical pass thereof for scan and sensing.

With regard to the requirement for high standards of printed bar code image quality, the bar code images must be of uniform thickness with straight sharp edges and uniform parallel spacing between them so that a target pattern of high resolution is presented to the optical sensing head. With regard to the second requirement, the larger the target pattern the more easily it is acquired and read by either manual or mechanical presentation to an optical scanning device sensing head for reading.

For purposes of providing a high standard of printed bar code image quality on such an item, in say label printing, with a reasonable degree of flexibility in printing options and product output at reasonable printing speeds, the computer driven and controlled class of pulsing hammer printers employing printing drums, thimbles, daisy wheels or the like with raise-engraved fixed font characters represents that which is probably the currently available optimum of printing equipment for producing items such as labels with bar code character target patterns in combination with human readable matter.

However, until the present invention, raise-engraved fixed font bar code characters, and thus the printed image generated therefrom upon a label or the like by and on the computer driven and controlled pulsing hammer class of printers, have been limited in height as a consequence of the hammer size or mass that could be cycled with the speed and accuracy otherwise possible. It is a simple mechanical fact that as hammer size and mass is increased, in order to accommodate the printing of larger character sizes in the font, there is a rapid degradation of the printed character image quality.

Bar code characters are essentially vertical line images printed in a spaced parallel disposition whereby the machine readable information coding imbedded therein is a function of the pattern of an array of varying width combinations of such lines. Therefore, to print an extended height bar code pattern, if one cannot mechanically accomplish that end at retained accuracy and speed by simply increasing both pulsing hammer size and mass in combination with a corresponding increase in bar code font character size, then other approaches are necessary. Another application which is electro-mechanically similar, but functionally distinguished, is the teaching by Mia et al in U.S. Pat. No. 4,320,980 dated Mar. 23, 1982, for reverse printing light characters on a dark background.

The instant invention, however, discloses a method for employing standard computer driven pulsing hammer raise-engraved fixed font printers of that type wherein the long axis of the bar code font characters are disposed parallel to the lateral edge direction of pitch advance feed of the print stock material for printing extended height continuous vertical lines in the form of bar code characters with standard size pulsing hammers but employing a font of bar code raise-engraved characters which are of a slightly greater elevation than the pitch advance of the printing stock thereby enabling the generation of larger printed bar code pattern target images being to any height multiple of pitch advances desired, by a simple technique of bar code printed image aligned and abutted overlap printing, accomplished in concurrently printed combination with human readable matter, all on a single printer pass without the need for reverses and repetitive incremental feeds of printing stock less than that of the normal sequential pitch advance of the particular machine being employed.

SUMMARY OF THE INVENTION

It is the principal object of the present invention to provide a bar code printing method adapted for utilizing currently available computer driven pulsing hammer raise-engraved fixed font printers of that type wherein the long axis of the bar code font characters are disposed parallel to the lateral edge of direction of pitch advance feed of the print stock material whereby the generation of high density and high resolution bar code image target patterns of extended height are produced.

It is another object of the present invention to provide a bar code printing method which in turn provides an extended height bar code image target pattern of a sufficient size so as to enhance either the manual or mechanical presentation thereof to the sensing head of an electronic scanner-reader and thereby in turn enhance facilitated scanner-reader bar code image target pattern acquisition and sensing with greater accuracy.

Yet another object of the present invention is to provide a bar code printing method which simply and reliably accomplishes extended height bar code image target pattern printing by the technique of utilizing raise-engraved bar code characters in the printing font which are of a slightly greater elevation than the pitch advance of the printing stock feed whereby each successive impact printed bar code character image on printing stock pitch advance vertically registers on and slightly overlaps the previously printed image thereof and thus generates a continually printed bar code image target pattern to a line length of any multiple of pitch advances desired.

A further object of the present invention is to provide a bar code printing method whereby extended height bar code image target patterns are produced while at the same time enabling the continued utilization of optimum pulse hammer size for the particular drum printer employed and thus maintaining the inherent quality, resolution, and speed characteristics and capability of the computer driven pulsing hammer raise-engraved fixed font drum printer.

An additional object of the present invention is to provide a bar code printing method which enables the production of multiple and distinctly different extended height bar code image target patterns and human readable matter in combination in any layout format, design, or position within the printed item boundary with but a single printer pass.

It is also an object of the present invention to provide a bar code printing method which produces multiple and distinctly different extended height bar code image target patterns and human readable matter in combination by utilizing currently available equipment and technology without the requirement of effecting any electro-mechanical change or modification thereof.

BRIEF DESCRIPTION OF THE DRAWINGS

FIG. 6 is a simplified enlarged side elevation view of the pitch advance and hammer bank sections of the exemplary prior art computer driven pulsing hammer raise-engraved fixed font printer shown in FIG. 4.

FIGS. 7a and 7b are simplified views respectively illustrating the initial pitch advance and pulsing hammer extended height bar code image impact print output therefrom.

FIGS. 8a through 8c are simplified view respectively illustrating the second pitch advance and bar code printed image output overlap feature of the method of instant invention whereby an extended height bar code image target pattern is produced.

FIGS. 9a and 9b are simplified views respectively illustrating subsequent multiple pitch advances and progressive bar code printed image output overlaps obtained by the method of instant invention whereby a continually printed extended height bar code image target pattern to a total line length of any multiple of pitch advances desired is produced.

DETAILED DESCRIPTION OF THE INVENTION

Figure 1:
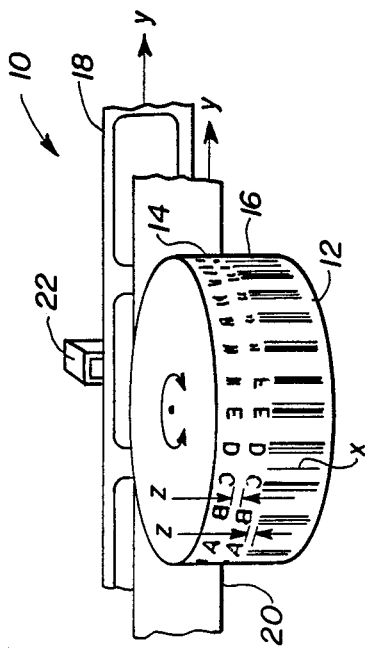
FIG. 1 is a simplified perspective view of an exemplary prior art computer driven pulsing hammer raise-engraved fixed font ribbon printer capable of producing a combined label output of both human readable matter and a fixed-height bar code image target pattern.

Referring first to FIG. 1, in consideration initially of the typical current prior art electro-mechanical methodology in accomplishing relatively high speed, high resolution, accurate bar code printing of the type which produces, for example, a printed label output of a bar code image target pattern combined with human readable matter as performed on an exemplary prior art computer driven pulsing hammer raise-engraved fixed font ribbon printer 10, wherein the primary operational elements thereof for purposes of this consideration are a print drum 12 which supports a raise-engraved human readable letter and numeral character font 14 as well as a raise-engraved bar code character font 16. The printer 10 also provides appropriate means to index and rotate/counter-rotate said drum 12 with respect to character spacing advance of label print stock 18 and a carbon ribbon 20 both activated in electro-mechanical timing and phase with impact strikes of a hammer bank 22 which supports a plurality of pulsing hammers 24 not per se shown in FIG. 1 but seen in FIG. 2. It will be noted, as illustrated in FIG. 1, the direction of printed character spacing advance "y" of said label print stock 18 and carbon ribbon 20 is perpendicular to the long axis "x" of the bar code font characters on said print drum 12. As a consequence of the respective font 14 and 16 configurations upon said drum 12, there is no pitch advance function per se for line spacing "z" since the line spacing "z" is fixed by the respective font 14 and 16 raise-engraved layouts on said drum 12. It is a further consequence of the respective font 14 and 16 configurations upon said drum 12, and the relationship thereof to the direction of label print stock advance as above described, that the flexibility in creating labels of different impositions is substantially limited. As an example, if one wishes to add more lines of human readable matter 26 to a combined bar code label 28 as shown in FIG. 3, it then becomes necessary to add or stack another vertically disposed raise-engraved letter/numeral font therefor upon the face of said drum 12. Although one may change the printed label matter in both human readable and bar code character content without a change in the print drum 12, by way of the infeed computer control command, one may not change the imposition relationship of the human readable characters thereof with respect to the bar code characters on a printed label. Also, the only way to increase or extend the height of the bar code image target pattern print out 30 on the label 28, in order to enhance and facilitate scanner-reader bar code image target pattern acquisition and optical sensing with greater accuracy, is to increase the long axis "x" elevation of the raise-engraved bar code characters in the font disposed upon said drum 12 and also to provide a corresponding increase in the bar code pulsing hammer height and mass.

Figure 2:
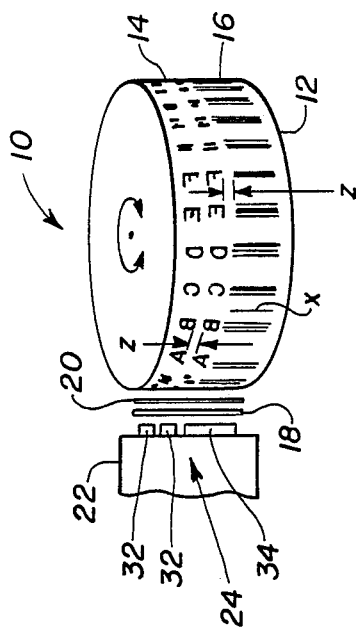
FIG. 2 is a side elevation view of the exemplary prior art computer driven pulsing hammer raise-engraved fixed font ribbon printer as shown in FIG. 1, but herein illustrating the pulsing hammer configuration for both the human readable matter fonts and the bar code image font.
Figure 3:
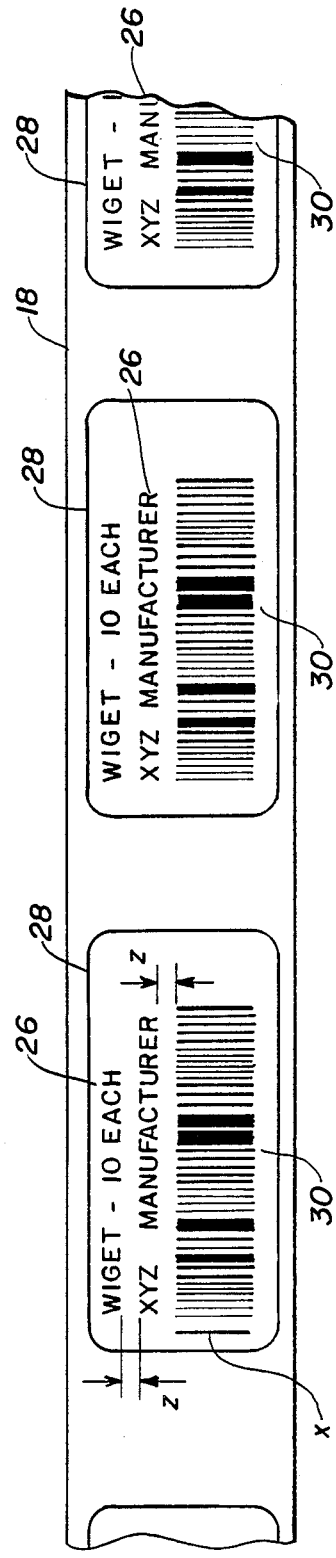
FIG. 3 is a front elevation view of a typical prior art combined printed item output product of both human readable matter and a fixed-height bar code image target pattern as delivered from the exemplary prior art computer driven pulsing hammer raise-engraved fixed font ribbon printer as previously illustrated in FIGS. 1 and 2.

Considering now FIG. 2, which more clearly illustrates the hammer bank 22 and the pulsing hammers 24 thereof being respectively the human readable font pulsing hammers 32 and the bar code font pulsing hammer 34. It will be noted that the respective pulsing hammer 32 and 34 profiles are of a relative size and mass necessary to accommodate impact printing of the various human readable and bar code raise-engraved characters 14 and 16 upon the label print stock 18 through the interleaved carbon ribbon 20. In the foregoing regard, so as to maintain the optimum printing speed, accuracy, and quality capabilities of a computer driven pulsing hammer raise-engraved fixed font printer, whether it be of the ribbon type 10 as shown, or of another type as will hereinafter be described in detail, the maximum practical bar code font character long axis height "x" and corresponding bar code font pulsing hammer 34 height, is on the order of 0.4-inch, which is to say, the bar code image target pattern print out 30 as illustrated in FIG. 3 also has a maximum bar code long axis "x" printed image height of 0.4-inch, and there is no known practical electro-mechanical method to increase the bar code image printed pattern target height print out with the equipment shown without a substantial loss of printing speed and accuracy, and an unacceptable degradation of the bar code print out image quality.

In summary, then, as previously described in detail the prior art computer driven pulsing hammer raise-engraved fixed font printer output of a combined bar code label 28, which includes lines of human readable matter 26 and a bar code image target pattern print out 30, is restricted in imposition flexibility in the latitude of arrangements thereon of human readable characters with respect to the bar code characters, and second if one is to realize the favorable printing speed, accuracy, and quality capabilities of the printer 10 then because of the bar code font pulsing hammer 34 practical size and mass limitations and the corresponding practical bar code character long axis "x" height limitations of the bar code font, then the bar code image target pattern print out 30 as shown on the combined bar code labels 28 in FIG. 3 are practically limited to a maximum long axis "x" height of 0.4-inch.

Figure 4:
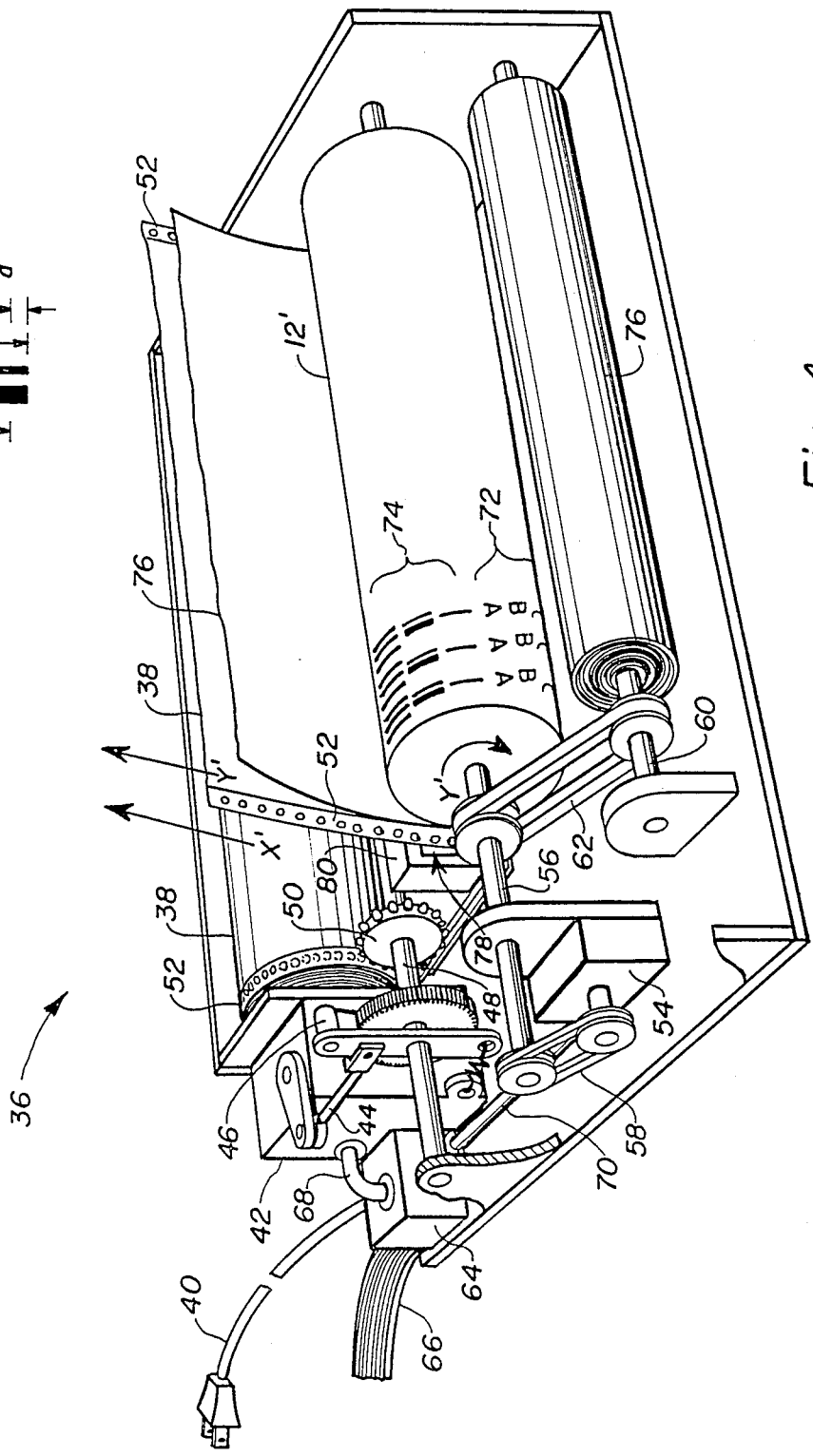
FIG. 4 is a simplified perspective view of an exemplary prior art computer driven pulsing hammer raise-engraved fixed font drum printer of that type employed in accomplishing the bar code printing method of the present invention, being a printer wherein the long axis of the bar code font characters are disposed parallel to the lateral edge direction of pitch advance feed of the print stock material.

Considering now FIG. 4 and the bar code printing method of instant invention in view thereof for producing an extended height bar code image target pattern print out in combination with human readable matter on printed matter having imposition alternatives of greater flexibility. The machine illustrated in FIG. 4 is of the same class printer as previously described, however in this case, being necessary for practicing the bar code printing method herein taught, is a computer driven pulsing hammer raise-engraved fixed font drum printer 36 wherein the long axis "x" of the bar code font characters are disposed parallel to the lateral edge direction "x'" of pitch advance feed direction "y'" of the perforated margin print stock material 38.

The printer 36 is of typical design and component configuration, being plugged into an electrical energy source by means of cord 40 which powers up the pitch advance solenoid 42 connected by linkage 44 to the pitch advance ratched drive 46 which in turn connectably communicates by means of the pitch advance drive shaft 48 to the tractor drive printing stock pitch advance 50 that registrably engaged holes in the perforated lateral margin 52 of the label print stock 18' and indexibly advances the print stock line-by-line in accordance with the set line pitch of stock advance of the printer 36. The cord 40 also provides transmission of power to the printing drum drive motor 54 which transmits rotary drive power to the print drum drive shaft 56 through pulley and belt drive 58, and off of said print drum drive shaft 56 provides rotary drive power to the carbon web feed shaft 60 through supplemental pulley and belt drive 62. Electronic control commands to effect electro-mechanical printing, pitch advance, and other functions in accomplishing programmably initiated output from said printer 36 are infed through the computer junction 64 which is powered from a computer through tape 66 and in turn communicates pitch advance solenoid 42 commands through computer junction-to-solenoid cable 68 and printing drum drive motor 54 commands through computer junction-to-drive motor cable 70.

In practice, the typical pitch advance of a drum printer 36 as exemplified in FIG. 4 is usually on the order of 8 lines per inch, although the pitch advance thereof may be more or less than that. For purposes of exemplary discussion here, however, which is not to be considered as per se limiting, as will regard the pitch advance of said drum printer 36 as being set at 8 lines per inch, which corresponds to an indexed tractor drive printing stock pitch advance of the perforated margin label print stock 38 of 0.125-inch for each line of either human readable font characters 72 or extended height bar code font characters 74 printed from the raise-engraved print drum long axis regularly repeating array respectively thereof set upon the print drum 12' as shown in FIG. 4, and, for example, if the respective human readable and bar code characters in each of said fonts 72 and 74 are in turn set at typical 0.010-inch center-to-center spacings across a print drum 12' that has for example a drive shaft parallel long axis dimension of say 15-inches, then there would be a 150-times regular repetition of each character in each line of font 72 and 74 in the respective print drum long axis dimension array thereof.

Figure 10:
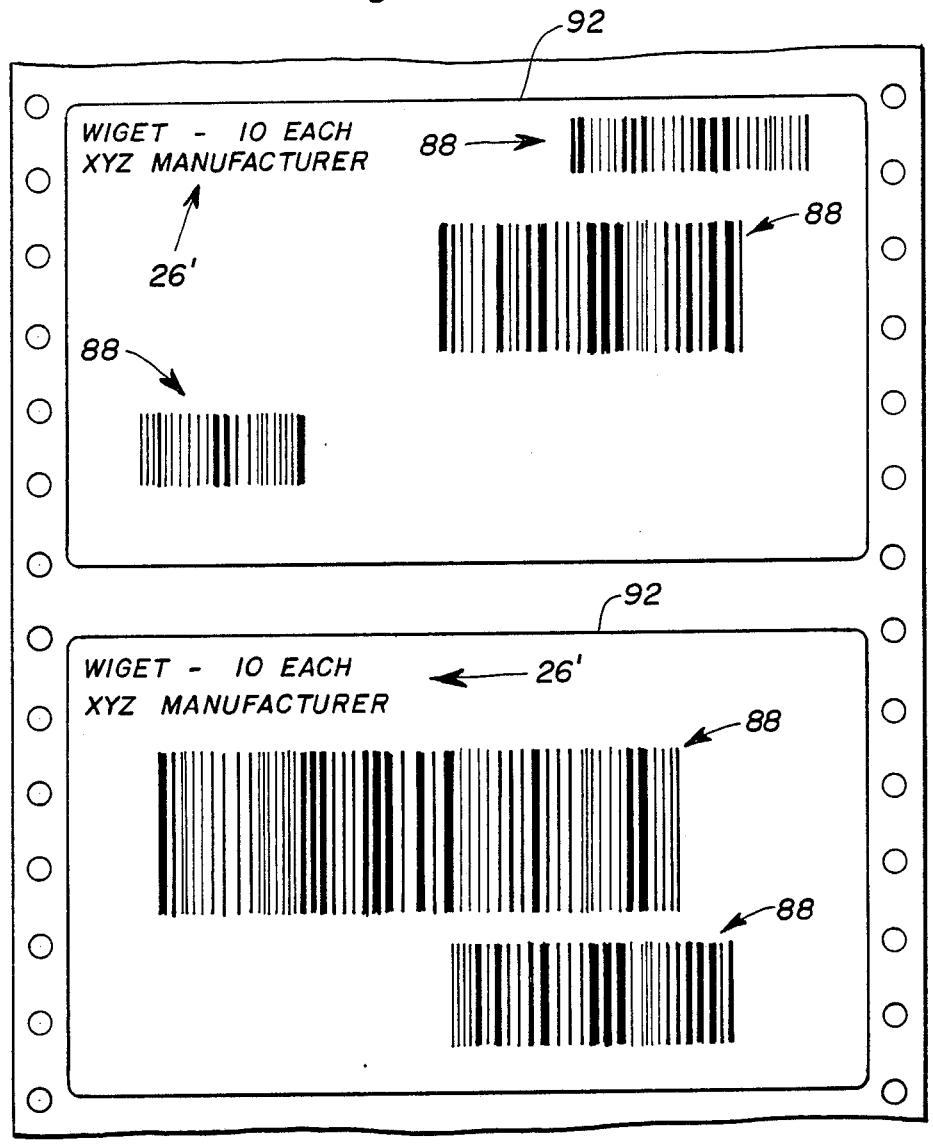
FIG. 10 is a front elevation view of typical combined printed item output products of both human readable matter and extended height bar code image target patterns as accomplished and delivered by the bar code printing method of instant invention.

Operating in electro-mechanical phase with the print drum 12' and the tractor drive printing stock pitch advance of the perforated margin print stock 38 is the carbon web 76 which friction-feed advances off the carbon web feed shaft 60 along with said print stock 38 through a print stock/carbon web feed gate 78 and provides the image transfer medium whereby computer controlled imprint of both human readable and extended height bar code characters by means of the pulsing hammer bank 80 operation are effected upon said print stock 38 to form combined human readable and extended height bar code labels as shown in FIG. 10 to be later herein considered.

With respect to said pulsing hammer bank 80, for every character in the regular repetition thereof in a particular line of font along the long axis dimension array upon said print drum 12', there would be a corresponding pulsing hammer 84 therefor, which in the case of our instant exemplary drum printer 36 would be 150 such pulsing hammers 84 in said bank 80.

In the discussion of the equipment for practicing the method of bar code printing to produce an extended height bar code image target pattern, we have referred to the extended height bar code font characters 74, which it is to be understood are of a uniformly slightly greater elevation than the pitch advance of the drum printer 36 but not extended in terms of the maximum practical height of a bar code character that can be printed at speed with the output printed image quality typically deliverable from the computer driven pulsing hammer raise-engraved fixed font class of printers. That is to say, the extended height uniformly slightly greater elevation of the extended height bar code font characters is with reference to, as in our current example, the 8 lines per inch pitch, or 0.125-inch and not the practical maximum long axis "x" height of 0.4-inch as previously described in consideration of prior art. Thus, one is able by the method hereof to effect extended height bar code image printing of target patterns exceeding the 0.4-inch practical limit, but with pulsing hammers well within the size and mass constraints which enable a retention of the output speed and quality deliverable from the computer driven pulsing hammer raise-engraved fixed font class of printers as aforesaid, which is to be regarded as an important feature and advantage of the method of bar code printing of instant invention.

Figure 5:
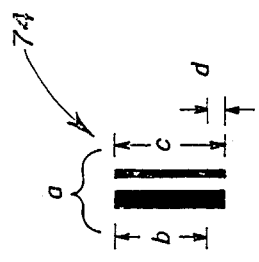
FIG. 5 is an enlarged fragmentary front elevation view of one of the bar code font characters typical of the bar code font employed in accomplishing the bar code printing method of the present invention, wherein each of the raise-engraved bar code characters in the font art of a uniformly slightly greater elevation than the pitch advance of the printing stock.

Considering now FIG. 5 and a more detailed discussion of the extended height bar code font characters 74, and the uniformly slightly greater elevation thereof, as a comparative dimension with respect to the drum printer 36 pitch advance. As shown in FIG. 5, the two parallel equal length but different width lines denominated "a" represent a typical exemplary extended height raise-engraved bar code font character 74, wherein the dimension "c" thereof represents the height of said character 74 which as can be seen in FIG. 5 is of a uniformly slightly greater elevation than that of the line pitch of stock advance "b" of said printer 36 by an amount "d", where "d" represents the bar code character computer controlled pitch advance successively repetitive overlap differential amount on successive pitch advance abutted and aligned printings of said character 74 from line-to-line to create an extended height bar code image component 86 as shown in FIGS. 8b and 9b, and in combination with other such components form an extended height bar code image target pattern 88 as shown in FIG. 10.

Thus, more specifically with respect to our instant example of consideration in employing the bar code printing method hereof, the human readable font characters 72 would be designed and styled in a printing font size so as to accommodate a printer 36 pitch advance of 8-lines per inch, or 0.125 inch, and provide a proper row or line-to-line spacing amount for the human readable output matter all of which within any particular line thereof from row-to-row would be contained with a visually acceptable line-to-line spacing within the vertical dimension "b" as shown in FIG. 5, being as previously pointed out the line pitch of stock advance from row-to-row. The engraved height of bar code character along the long axis thereof, as well as the vertical elevation of the face of each pulsing hammer 84 within the pulsing hammer bank 80, for purposes of generating an extended height bar code image target pattern 88 by the method hereof is the vertical dimension "c" as shown in FIG. 5, which as can be seen is of a uniformly slightly greater elevation than the line pitch of stock advance "b" by an amount "d", which is the amount of bar code character pitch advance overlap differential. Exemplary only, and not to be considered as limiting, in our example involving a printer 36 pitch advance of 8-lines per inch, the engraved height of a bar code character "c" to provide an extended height bar code image target pattern 88 would be on the order of 0.150-inch to provide a bar code character pitch advance overlap "d" of 0.025-inch, which is that amount of differential overlap of the bar code characters within the extended height bar code font of characters 74 which in turn on successive aligned and abutted computer controlled pitch advance printings thereof from line-to-line enables the continuous row-to-row printing of an extended height bar code image target pattern 88 to whatever successive overlap print strikes are cumulatively entered into a particular print program command or instruction. It should also be pointed out that utilization of a tractor drive printing stock pitch advance 50 as shown in FIGS. 4 and 6, in combination with perforated margin print stock 38 as also shown therein, on a drum printer 36 provides stock advance and alignment control which enables row-to-row overlap abuttment registration of successive print strikes in effecting the generation of an extended height bar code image target pattern 88 by the method hereof.

Referring now to FIG. 6, being a simplified enlarged side elevation view of the pitch advance and printing sections of said drum printer 36, which is to be considered simultaneously in conjunction with the further simplified view series as illustrated in FIGS. 7a through 9b to explain in greater detail the mechanism of successive abutted and aligned advance and overlap printing impressions of the extended height bar code font characters 74 in practice of the bar code printing method hereof in generating an extended height bar code image component 86 of an extended height bar code image target pattern 88 of the type illustrated in FIG. 10. As shown in FIG. 6, the perforated margin print stock 38 is indexed and fed by means of the tractor drive printing stock pitch advance 50 along with the carbon web 76 which is friction fed therewith in controlled advance through the print stock/carbon web feed gate 78 and positioned by infeed computer control command for impact print impression of an extended height bar code font character 74 upon said print stock 38 by computer control command impulse cycling of the appropriate pulsing hammer solenoid 90 which fires the pulsing hammer 84 to effect printing impact as shown in simplified side elevation view in FIG. 7a to produce the initial computer controlled line printing of an extended height bar code font character image component 86 upon the print stock 38 as illustrated in FIG. 7b, where the line "p" in FIG. 7a represents the initial reference position for pitch advance cycle of the print stock 38 for initial extended height bar code image component 86 print output image elevation segment imprint. It will be noted that the printed elevation of the extended height bar code image component 86 is dimensioned "c", being the same as that of the engraved height of the bar code character which is of uniformly slightly greater elevation than the line pitch of stock advance "b".

The view shown in FIG. 8a illustrates an initial line-to-line pitch advance of the print stock 38 to the next printing row as referenced by arcuate pitch advance movement of the line "p" which shows repositioning of the original initial reference position for pitch advance cycle whereby on the next subsequent sequential printing there is an aligned and abutted extended height bar code image component 86 elevation differential overlap between that image height "c" made by the extended height bar code font character 74 and the line pitch of stock advance "b" of an amount "d" which as previously explained, and shown in FIG. 8b and in greater detail in FIG. 8c, is the bar code character pitch advance overlap which provides the joining continuity in printed image generation of an extended height bar code image component 86 by the printing method hereof with each successive add-on print image elevation segment imprint.

The view shown in FIG. 9a illustrates a subsequent sequential line-to-line pitch advance of the print stock 38 to the next progressive printing row as again referenced by arcuate pitch advance movement of the line "p" which shows subsequent sequential repositioning of the original initial reference position for pitch advance cycle whereby on the following subseqeunt sequential printing there is again an aligned and abutted printed image elevation add-on to the generation of the extended height bar code image component 86 by an amount of the stock pitch advance "b" again with a joining continuity bar code character pitch advance overlap differential amount "d". Overall, the total height of any particular extended height bar code image pattern printout is a function of that total number of computer controlled pitch advance cycles entered, the cumulative number of which times the pitch advance amount equals the desired extended height dimension of said extended height bar code image target pattern.

In the foregoing discussion, only for the sake both of clarity and simplicity, the printing method as herein taught was explained in terms of the sequential generation of but a single extended height bar code image component 86. It is, however, to be understood that multiple printing impressions of both additional extended height bar code font characters 74 and human readable font characters 72 are carried out simultaneously across the longitudinal print drum 12' dimension in each row printed in the production of extended height bar code printed items such as labels 82 as shown in FIG. 10 which contain both lines of human readable matter 26' in combination with extended height bar code image target patterns 88 as generated by the printing method hereof.

I claim:

1. A bar code printing method for generating an extended height bar code image target pattern on a bar code printed item by employing a computer driven pulsing hammer raise-engraved fixed font printer of that type wherein the long axis direction of a font of an array of bar code characters are disposed by engraving the same upon a drum of said printer in an orientation parallel to the lateral edge direction of the printer having a pitch advance of 0.125-inch for a print stock material, in combination with an extended height bar code character font wherein the long axis dimension of an array of said extended height bar code character font is 0.150-inch thereby being of a uniformly slightly greater elevation than that of said pitch advance of said print stock material so as to in turn thereby respectively enable a computer controlled pitch advance successively repetitive overlap differential of 0.025-inch therebetween in bar code font character printout from row-to-row, said method comprising the steps of first effecting an initial computer controlled line printing upon said print stock material of each of an extended height bar code font character component comprising a 0.150-inch print output image elevation segment imprint of a bar code image target pattern, thereafter effecting a computer controlled print stock material pitch advance of 0.125-inch and a sequentially progressive repetitive aligned and abutted extended height bar code character font 0.025-inch overlap printing of each of said extended height bar code font character component elements to thereby comprise an add-on print output image elevation segment to said bar code image target pattern, and continuing a sequentially successive computer controlled print stock material 0.125-inch pitch advance and sequentially progressive repetitive aligned and abutted series of computer controlled differential 0.025-inch overlap printing cycles to that number of such cycles the computer controlled pitch advance total of which cumulatively equals the desired extended height dimension of said extended height bar code image target pattern to be generated without a shortened pitch advance or any reverse movement of the print stock material.

2. The bar code printing method according to claim 1 wherein said extended height bar code image target pattern is imprinted upon said print stock material in combination with at least one other of a different extended height bar code image target pattern to produce said bar code printed item.

3. The bar code printing method according to claim 2 wherein said bar code printed item is further imprinted with a plurality of characters comprising human readable matter.

4. The bar code printing method according to claim 1 wherein said pitch advance of said print stock material is accomplished by a tractor drive.

* * * * *